C. W. WELSH.
COMBINED GUANO DISTRIBUTER AND COTTON SEED PLANTER.
APPLICATION FILED AUG. 3, 1908.
908,919.
Patented Jan. 5, 1909.
2 SHEETS—SHEET 1.
Fig. 1.
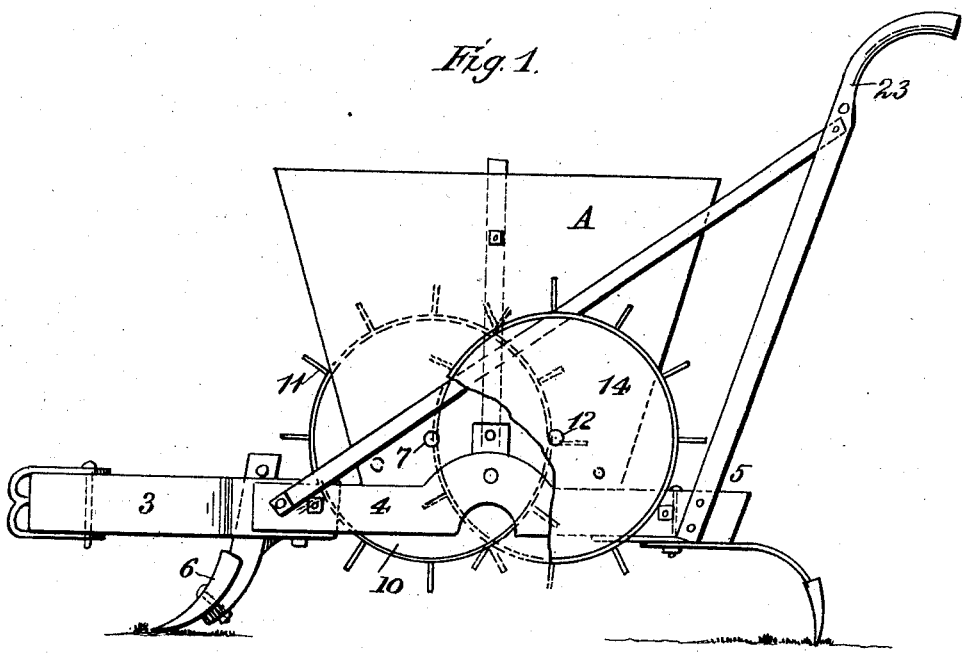
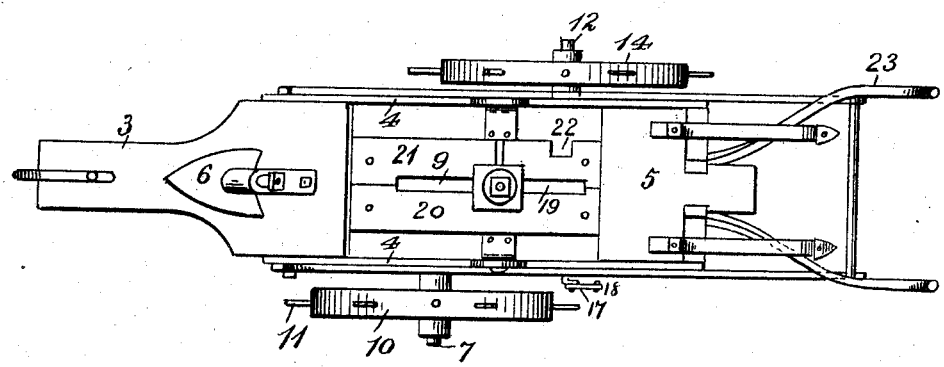
Fig. 3.
Witnesses
F. L. Ourand
M. K. Freeman
Inventor
Charles W. Welsh
By Louis Baggett Co
his Attorneys C. W. WELSH.
COMBINED GUANO DISTRIBUTER AND COTTON SEED PLANTER.
APPLICATION FILED AUG. 3, 1908.
908,919.
Patented Jan. 5, 1909.
2 SHEETS—SHEET 2.
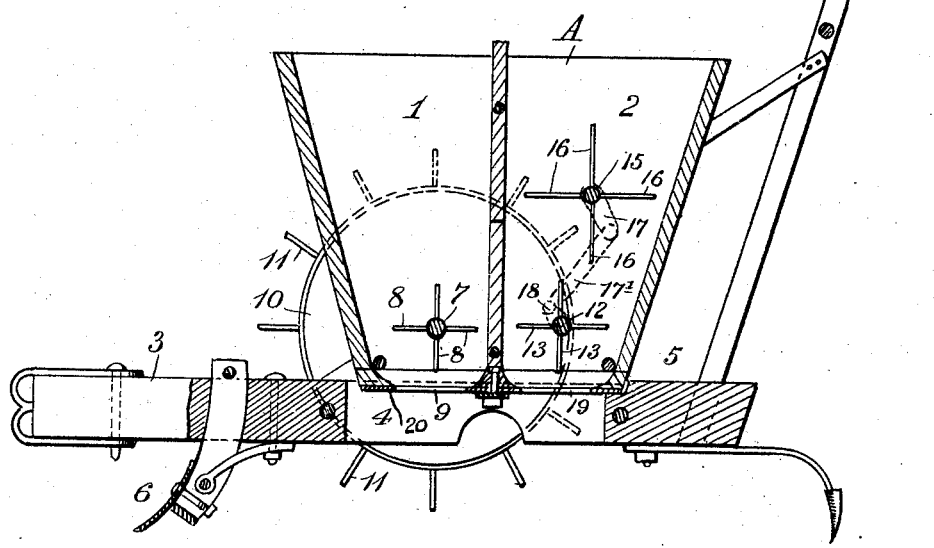
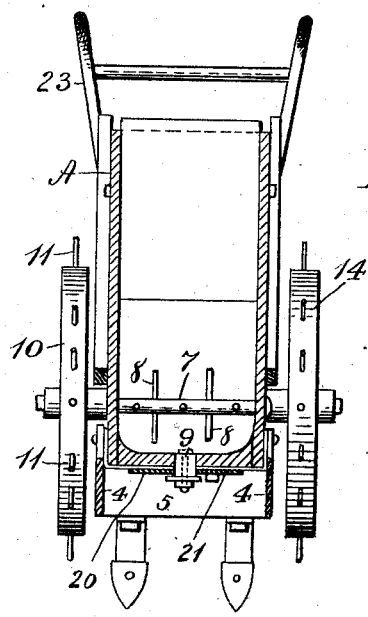

UNITED STATES PATENT OFFICE.

CHARLES WM. WELSH, OF BUFFALO, ALABAMA.

COMBINED GUANO-DISTRIBUTER AND COTTON-SEED PLANTER.

No. 908,919.　　　　Specification of Letters Patent.　　　　Patented Jan. 5, 1909.

Application filed August 3, 1908. Serial No. 446,692.

*To all whom it may concern:*

Be it known that I, CHARLES WM. WELSH, a citizen of the United States, residing at Buffalo, in the county of Chambers and State of Alabama, have invented certain new and useful Improvements in a Combined Guano-Distributer and Cotton-Seed Planter, of which the following is a specification.

My invention relates to an improvement in a combined guano distributer and cotton seed planter, and the object is to provide means whereby fertilizer will be distributed through the planter by agitating means and the cotton seed dropped and planted as the planter is drawn over the ground.

A further object resides in providing a wheel for each compartment of the planter, and connected to these wheels are agitating means which stir up the fertilizer and seeds, whereby they are properly distributed as the planter is drawn along.

Another object is in the provision of the feed slide which can be so adjusted to permit of the planting of grain, peas, and the like.

The invention consists in certain novel features of construction and combinations of parts which will be hereinafter described and pointed out in the claims.

In the accompanying drawings, Figure 1 is a view in side elevation, Fig. 2 is a longitudinal, vertical, sectional view, Fig. 3 is a bottom plan, and, Fig. 4 is a cross-section.

A, represents the hopper which is made of two compartments 1 and 2, the compartment 1 being for the guano or fertilizer, and the other compartment for the seed to be planted. A beam 3 has two plates 4, 4, connected thereto, which plates are connected at their other ends to a bar 5, which forms a frame or body for the hopper of the planter. The planter is pivotally supported on the plates between the bar 5 and beam 3.

Connected to the beam 3 is the standard and plow 6 for making the usual furrow for the seeds, and connected to the bar 5, and suitably spaced apart are the cultivator bars and teeth for covering the grain or seed after it has been discharged from the body or hopper A.

A shaft 7 extends through the walls of the hopper in the fertilizer compartment, and agitating fingers or bars 8, 8, are connected to the shaft for stirring up the fertilizer and feeding it through the opening 9 in the bottom of the hopper. A wheel 10 is mounted on the shaft 7 and teeth 11, 11, are formed on the rim of the wheel, which is caused to revolve as the planter is drawn along by coming in contact with the soil which rotates shaft 7. A similar shaft 12 is journaled through the walls of the hopper and extends through the compartment 2, which holds the seed, and this shaft is provided with the agitating fingers 13, 13. Mounted on the shaft is a wheel 14 similar to the wheel 10 but in the rear of the wheel 10, and on the opposite side of the planter. In the seed compartment 2, a shaft 15 is mounted carrying agitating fingers 16.

On one end of the shaft 15, a crank arm 17 is formed, to which is connected a rod 17'. The rod 17' is connected to the crank arm 18 on the shaft 12 whereby shaft 15 is given a quarter turn upon the revolution of the shaft 12. This additional shaft 15 keeps the grain or seed stirred up sufficiently so that there is no danger of the compartment becoming clogged and preventing the seed from passing through the opening 19 in the bottom of the hopper. Transversing the bottom of the hopper are metal plates 20 and 21. Plate 21 is capable of being adjusted with respect to the plate 20 to permit of sufficient space being formed whereby the fertilizer and seeds may be discharged from the hopper. One side of the plate 21 is provided with the notch 22 which is used when large seeds are to be planted, such as corn, peas, beans, or the like, by simply reversing the plate so that the notched portion will be received over the opening in the bottom of the compartment, permitting the seeds to pass through.

The usual handles 23 are attached to the body portion or frame of the planter for guiding the same as the seed is being planted.

From the foregoing it will be seen that I have provided means whereby the fertilizer may be distributed at the same time that the seed is being discharged from the planter, and further that agitating means is provided in both compartments which are operated independently of each other, and in the seed compartment, means is provided for operating two agitators.

Having fully described my invention, what I claim as new and desire to secure by Letters Patent, is:—

1. In a combined fertilizer distributer and planter, the combination with a body, of a hopper mounted thereon, compartments formed in the hopper, and agitator shafts journaled in the compartments, wheels mounted on the shafts, one of said wheels in advance of the other, and the wheels rotated by their contact with the soil as the planter travels, thereby operating the shafts.

2. In a combined fertilizer distributer and planter, the combination with a body, of a hopper mounted thereon, compartments formed in the hopper, and agitator shafts journaled in the compartments, wheels mounted on the shafts, one of said wheels in advance of the other, and the wheels rotated by their contact with the soil as the planter travels, thereby operating the shafts, a secondary shaft in one of the compartments, and means connecting said shaft with one of the main shafts, whereby said secondary shaft is given a quarter turn with each revolution of the main shaft.

3. In a combined fertilizer distributer and planter, the combination with a beam and bar, plates connecting the beam and bar, of a hopper pivotally mounted on the plates, agitators journaled in the hopper, wheels connected to the agitator shafts, one of the wheels in advance of the other for operating the shafts and discharging the contents as the planter travels.

In testimony whereof I affix my signature, in the presence of two witnesses.

CHARLES WM. WELSH.

Witnesses:
 JOHN A. TUCKER,
 J. W. A. VARDAMAN.